April 23, 1968
J. A. VANDERJAGT
3,379,411
JACKS EMPLOYING ELONGATED, TUBULAR PNEUMATIC ELEMENTS
Filed March 17, 1967
4 Sheets-Sheet 3
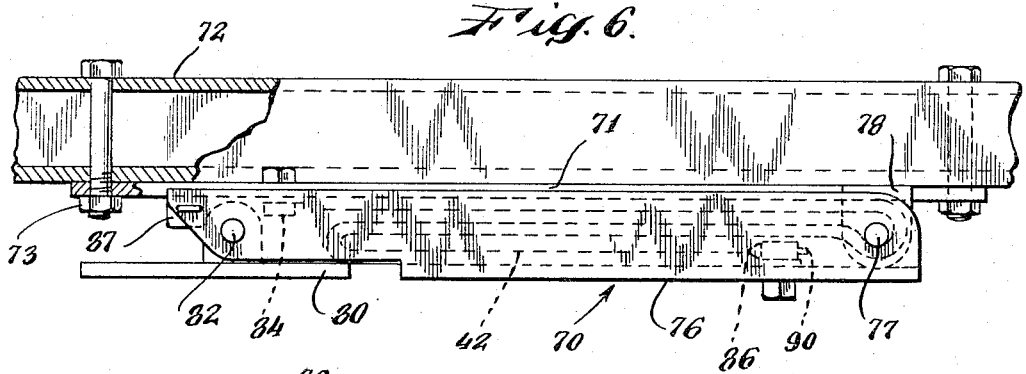
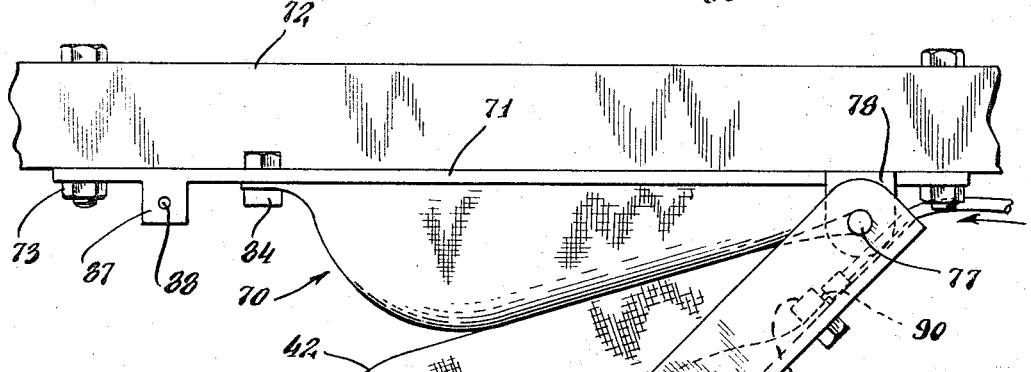
INVENTOR.
John A. Vanderjagt
BY
Blair, Buckles, Cesari & St.Onge
ATTORNEYS.

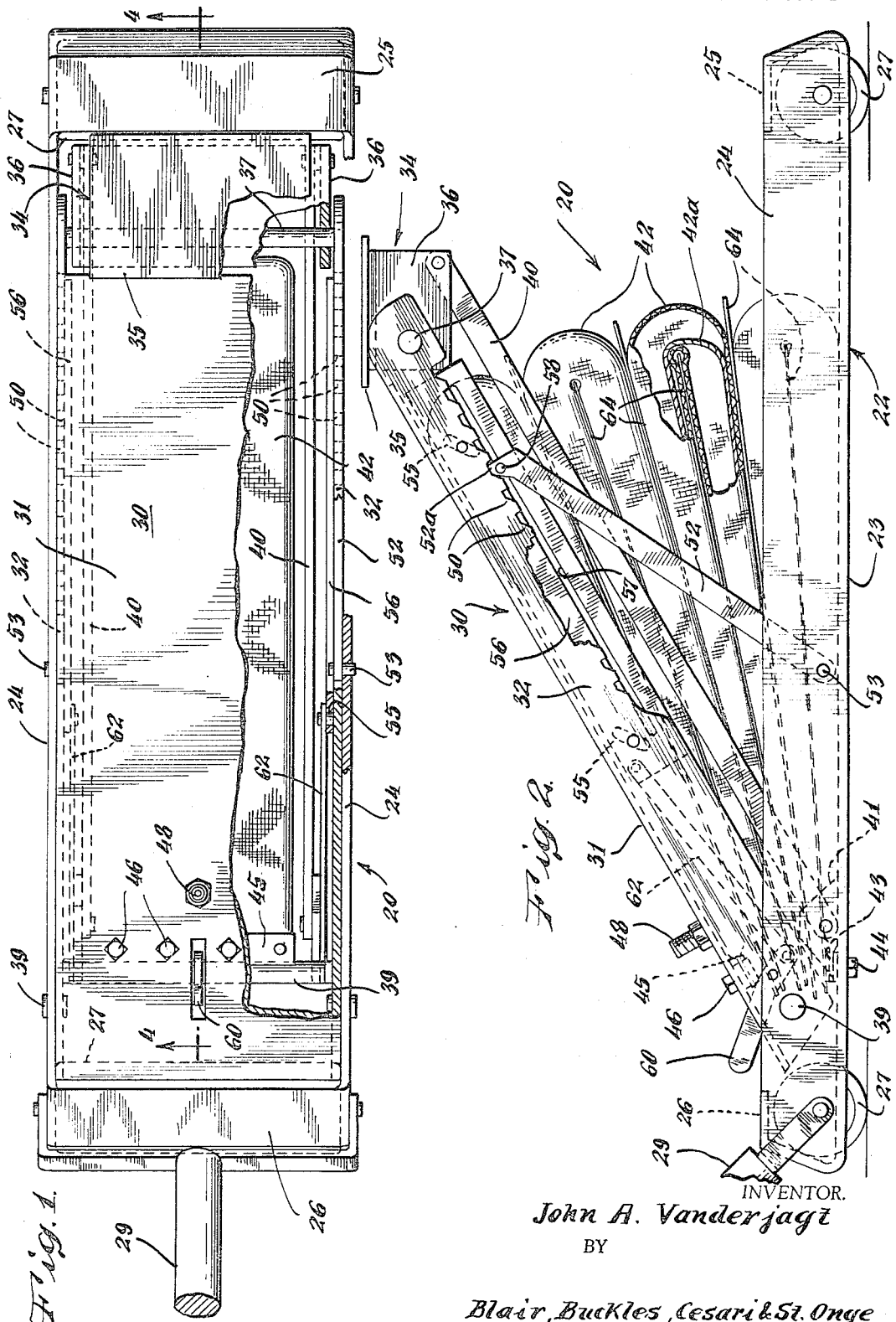

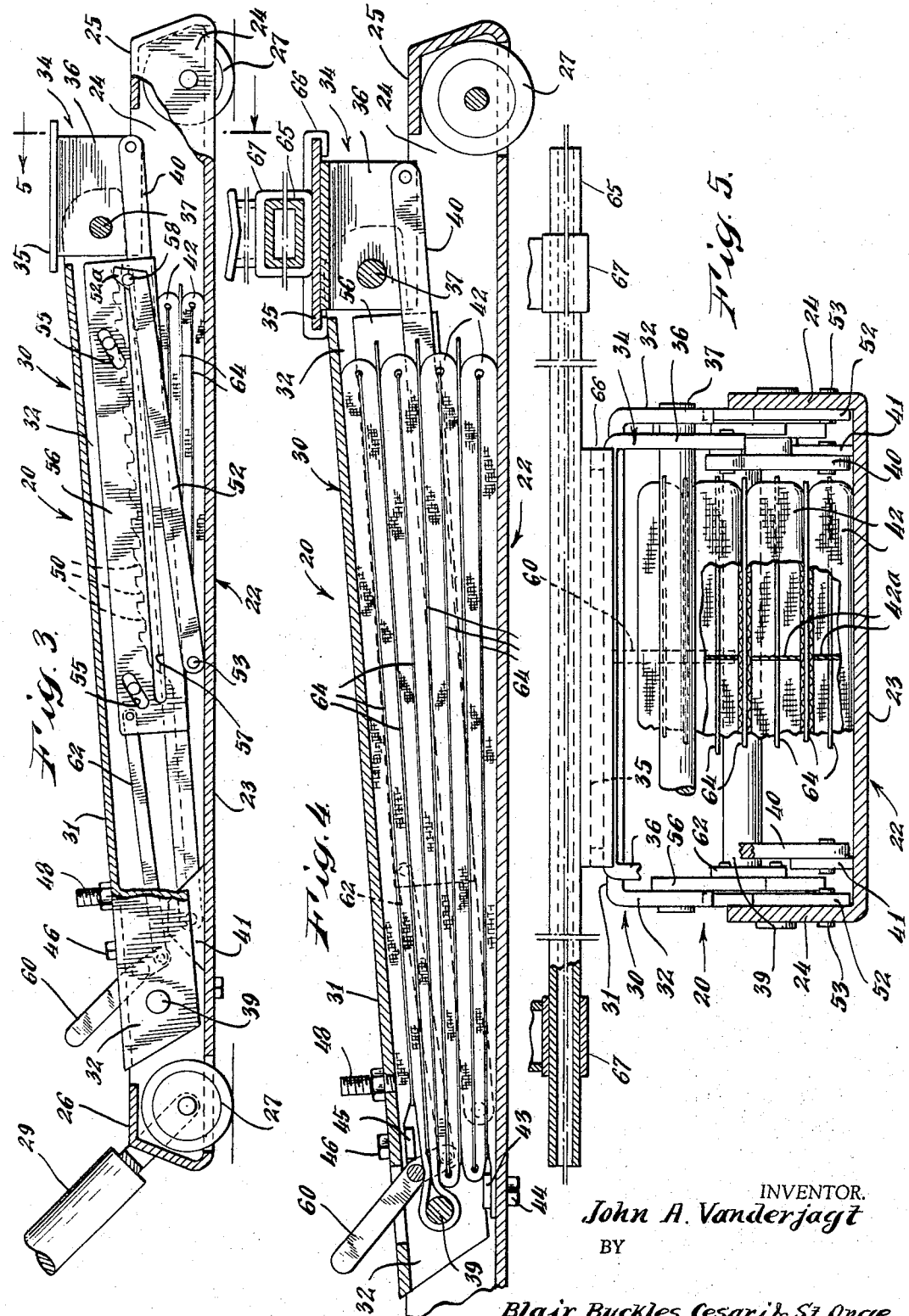

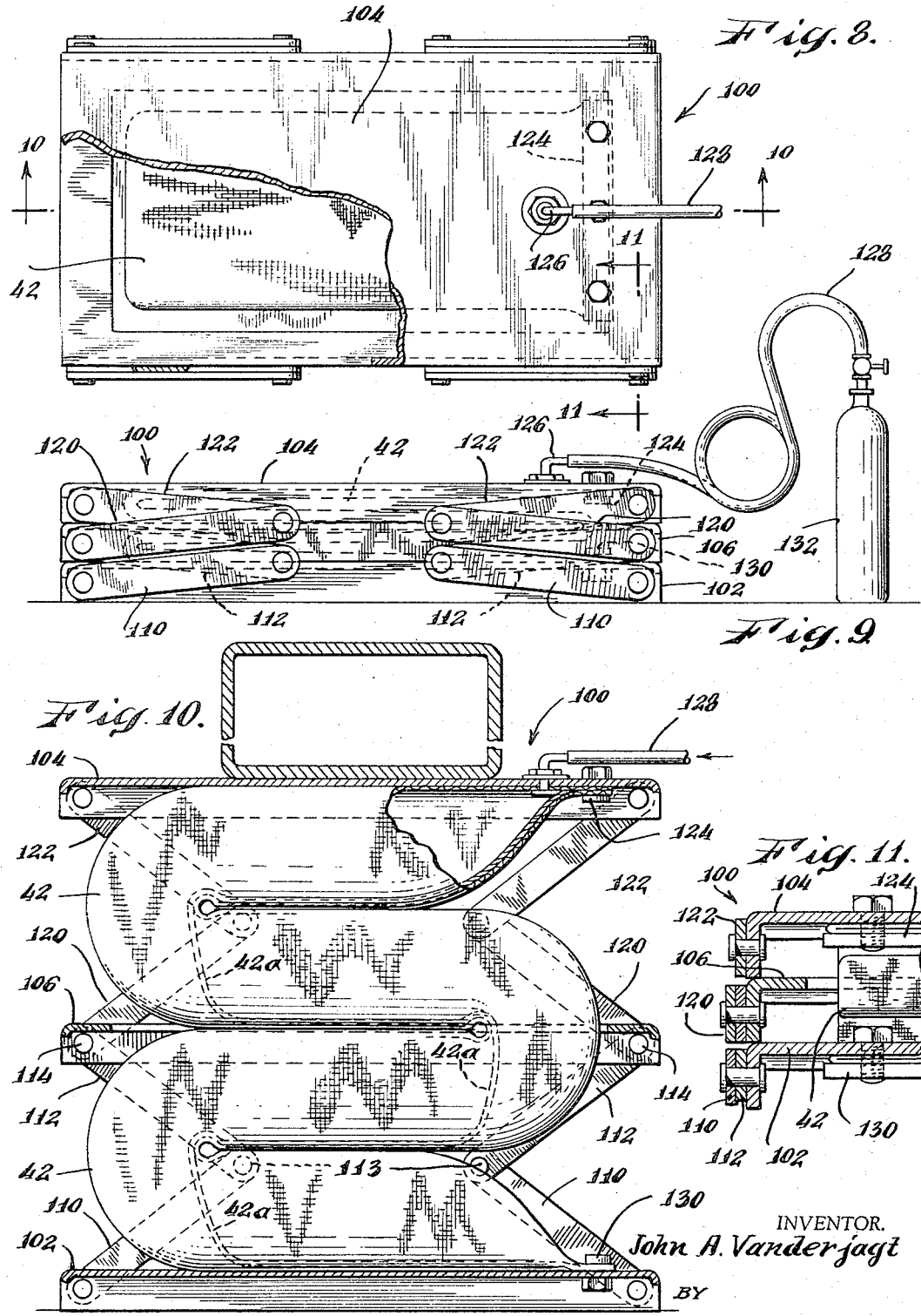

United States Patent Office 3,379,411
Patented Apr. 23, 1968

3,379,411
JACKS EMPLOYING ELONGATED, TUBULAR
PNEUMATIC ELEMENTS
John A. Vanderjagt, Memphis, Tenn., assignor to
Scienco, Inc., Memphis, Tenn.
Filed Mar. 17, 1967, Ser. No. 624,037
14 Claims. (Cl. 254—93)

ABSTRACT OF THE DISCLOSURE

The disclosed jacks utilize a length of hose folded several times on itself and disposed between a jack base and an interconnected lifting member. Both ends of the hose are sealed off to provide a single, expansible pneumatic chamber. A fitting communicating with the interior of the hose is connected to a source of air or other gas. Upon the introduction of compressed air, the folded hose expands and the expanding folds, pressing against each other, force the lifting member to move relative to the base, thereby achieving a lifting operation. Three embodiments are disclosed; one embodiment is in a heavy duty jack wherein the lifting member is pivotally connected at one end to the base; a second embodiment discloses a pneumatic jack suitable for permanent installation to the underside of an automobile chassis; and the third embodiment is a small, portable jack suitable for storage in a car trunk.

Background and objects of the invention

The prior art is replete with lifting jacks of all types and varieties. Except for the simple mechanical jacks which require considerable manual exertion to operate, the prior art jacking devices are complex, expensive and slow in operation. By my present invention I have devised simple inexpensive pneumatic jacks which may be operated in rapjid fashion from the compressed air sources available at all automobile garages and service stations. In an alterntive embodiment I provide a compact, light weight, completely portable pneumatic jack capable of being folded away in a small space within an automobile trunk, and operable from a small hand-held portable tank of compressed gas, such as $CO_2$ bottle of the type normally carried in vehicles as a fire extinguisher. In still another embodiment my small jacks may be permanently instaled to the underside of an automobile chassis where they remain out of the sight and in full clearance above the roadway until such time as a flat tire or other mechanical emergency requires their operation. These installed jacks may be inflated by a simple connection to a portable $CO_2$ bottle, or they may be connected to an air compressor driven off the vehicle engine. In all embodiments the economy of construction and reliability of operation is achieved through my use of folded sections of elongated flexible tubing, such as good quality flexible fabric fire hose, as the inflatable pneumatic element.

One of the objects of the invention is to provide improvements in the construction of automobile jacking devices which are economical of manufacture and reliable in use.

Another object is to provide such jacking devices which are operable in rapid fashion from readily available sources of compressed gas and which do not require any substantial effort on the part of an operator.

Other objects of the invention will in part be obvious and will in part appear hereinafter.

The invention accordingly comprises the features of construction, combinations of elements, and arrangement of parts which will be exemplified in the constructions hereinafter set forth, and the scope of the invention will be indicated in the claims.

For a fuller understanding of the nature and objects of the invention, reference should be had to the following detailed description taken in connection with the accompanying drawings, in which:

FIGURE 1 is a top plan view of a pneumatic jack constructed according to my invention, as particularly adapted for use in automobile garages and service stations;

FIGURE 2 is a side elevational view of the pneumatic jack of FIGURE 1 in operating configuration;

FIGURE 3 is a side elevational view, partially broken away, of the pneumatic jack of FIGURE 1;

FIGURE 4 is a sectional view taken along line 4—4 of FIGURE 1;

FIGURE 5 is a sectional view, partially broken away, taken along line 5—5 of FIGURE 3;

FIGURE 6 is a side elevational view of another embodiment of my pneumatic jack in retracted position as installed to the underside of a vehicle carriage or frame;

FIGURE 7 is an operational side view of the vehicle jack of FIGURE 6, showing the device in expanded lifting configuration;

FIGURE 8 is a top view, partially cut away, of a third embodiment of my pneumatic jack which is particularly adapted for portability;

FIGURE 9 is a side elevational view of the jack of FIGURE 8, shown in collapsed condition and connected to a portable source of compressed gas;

FIGURE 10 is an operational sectional view of the jack shown in FIGURES 8 and 9, taken along the line 10—10 of FIGURE 8, with the folded tubular member in expanded condition under gas pressure to apply lifting froce to a car frame or similar body; and FIGURE 11 is an enlarged cross-sectional detail view taken along line 11—11 of FIGURE 8.

Detailed description of the preferred embodiments

FIGURES 1 through 5 disclose a garage or service station type jack, generally indicated at 20, adapted to be actuated from a compressed air source. The jack 20 includes a base 22 in the form of an elongated steel channel member having a floor 23, upstanding sidewalls 24, and attached front and rear endwalls, 25 and 26, respectively. Front and rear rollers 27 (FIGURES 2 and 3), mounted by the base 22 protrude through laterally extending slots in the base floor 23 to roll on the floor so that the jack 20 may be readily moved about by handle 29.

A lifting arm 30 in the form of an elongated steel channel member having a top wall 31 and depending sidewalls 32 pivotally mounts adjacent its one end a lifting cap, generally indicated at 34. The lifting cap 34 includes a top plate 35 welded to a channel having downwardly extending laterally spaced sides 36. A pin 37 inserted through aligned apertures in the sidewalls 32 of the lifting arm and the sides 36 of the lifting cap 34 provides this pivotal mounting. The lifting arm 30 is, in turn, pivotally mounted adjacent its other end on a pin 39 mounted at its ends by the sidewalls 24 of base 22.

A pair of stabilizing arms 40, best seen in FIGURES 2, 3 and 5, are pivotally connected at their corresponding one ends to a bracket 41 fixed to base 22 and are pivotally connected at their corresponding other ends to the channel sides 36 of the lifting cap 34. The stabilizing arms 40 serve to maintain the lifting cap 34 generally horizontally oriented as the lifting arm 30 pivots on pin 39.

According to the invention, the pneumatic element of the jack 20 in FIGURES 1 through 5 consists of a length of conventional firehose, indicated at 42. I have found that a 4 inch diameter hose known in the trade as "mill hose," rated at approximately 250 p.s.i. bursting strength, is more than satisfactory for purposes of my invention. Actually, I have found that the operational air pressure within the hose 42 is from 50 to 60 p.s.i. when the jack 20 is used to lift even the heaviest American-made automobile.

As best seen in FIGURE 4, one end of the hose 42 is pinched off between a clamping bar 43 and the floor 23 of base 22. Bolts 44 passing through the floor 23 and the end of the hose and threaded into the clamping bar 43 are tightened down to seal off the end of the hose clamped therebetween. The first section extends over and is supported by the floor 23 of base 22. The hose 42 is then folded a plurality of times on itself and its other end pinches off between a clamping bar 45 and the top wall 31 of lifting arm 30. Bolts 46 draw up on the clamping bar 45 to securely seal off this end of the hose. In the disclosed embodiment, the hose 42 is folded 7 times on itself, but it will be appreciated that a greater or lesser number of folds can be employed according to the teaching of my invention. A fitting 48 mounted on the top wall 31 of lifting arm 30 communicates with the interior of the hose 42 to permit the introduction of air under pressure. The fitting 48 preferably includes a check-valve assembly which may be of the type employed in automobile tires.

As is best seen in FIGURE 2, with the jack in position beneath the undercarriage of an automobile, and air forced into the hose 42 through valved fitting 48, the hose expands. Since expansion of the portions of the hose adjacent the folds near the pivot pin 39 is restricted, the overall hose expands generally in the manner of a fan being unfolded. The expanding hose acts against the floor 23 and the top wall 31 causing the lifting arm 30 to swing upwardly to engage and lift an automobile, etc. A rope 42a, running the length of hose 42, prevents the hose walls from pinching completely together, thus insuring that air is distributed throughout the length of the hose.

As a safety measure, I prefer to provide a ratchet and pawl arrangement to act in concert with the inflated firehose 42 to releasably hold the lifting arm 30 in a raised position. To this end, the sidewalls 32 of the lifting arm, are relieved along their lower edges to form a series of ratchet teeth 50. A pair of pawls 52 are pivotally connected at their lower ends, as indicated at 53 in FIGURE 2, to the sidewalls 24 of base 22. A pair of spaced pins extending inwardly from each sidewall 32 of lifting arm 30 are received in elongated, diagonally oriented slots 55 formed in a pawl guide plate 56. The guide plate 56 is thus mounted by the pins 54 and is slidable relative to the ratchet teeth 50 of the lifting arm 30. An elongated slot 57 in each pawl guide 56 receives an inwardly extending pin 58 affixed to the pawls 52 adjacent their tips 52a. A lever actuator 60 pivotally connected to the base sidewall 24 moves the pawl guide 56 relative to the ratchet teeth 50 through interconnecting laterally and forwardly extending linkage rods, generally indicated at 62.

In operation, as the hose 42 is inflated to raise the lifting arm 30, the lever operator 60 is manipulated so as to move the pawl guide 56 downwardly and to the left as seen in FIGURE 2. As a consequence, the tips 52a of the pawls 52 clear the ratchet teeth 50 as the lifting arm 30 rises, carrying with it the pawls. When the lifting arms 30 has been raised to the desired height, the lever operator 60 is manipulated to move the pawl guide 56 upwardly and to the right as seen in FIGURE 2. This movement of the pawl guide 56 brings the tips 52a of the pawls 52 into engagement with the ratchet teeth 50. Thus, even if the hose 42 suddenly deflates, the pawls 52 will maintain the lifting arm 30 in its elevated position. To lower the jack, the pawl guide 56 is moved downwardly and to the left in order to disengage the pawls 52 from the ratchet teeth 50, thus permitting the lifting arm 30 to lower as air is exhausted from the hose 42 through the valved fitting 48. It will be appreciated that it may be necessary in order to readily disengage the pawls 52 to slightly increase the inflation of the firehose 42 before deflating.

As an additional feature of my invention, I provide separators 64 between overlying sections of the hose 42. These separators provide flat backing surfaces for the folded sections of the hose to expand against, and thus eliminate any tendency of the hose sections to slide laterally relative to each other.

In FIGURE 5, I disclose an attachment for converting jack 20 from a curb jack to a bumper jack. This attachment includes an elongated beam 65 adapted at its mid-portion with a bracket 66 for engaging the top plate 35 of lifting cap 34. Upstanding trough-shaped members 67 carried by the beam 65 adjacent each end engage the bottom edge of a vehicle bumper (not shown) to raise the vehicle as the lifting arm 30 rises upon inflation of the hose 42.

FIGURES 6 and 7 disclose an embodiment of my invention adapted as a vehicle attached jack 70 in which the length of hose 42 is incorporated. Preferably, the jack 70 is affixed to the vehicle frame along each side at a suitable location between the front and rear wheels. Thus, in practice the jack 70 is effective to lift one side of the car, raising both front and rear wheels off the ground.

The jack 70 includes a base 71 attached to the vehicle frame 72 by bolts 73. A lifting arm 76 is pivoted on a pin 77 carried by brackets 78 depending from base 71. A foot 80 is pivotally mounted on a pin 82 mounted by the lifting arm 76.

One end of the hose 42 is pinched off between clamping bar and the base 71 as indicated at 84. The hose 42 is looped around the pin 77 and extends back on itself to a point, indicated at 85, where it is again folded back on itself. The other end of the hose is pinched off between a clamping bar and the lifting arm 76 as indicated at 86. Laterally spaced brackets 87 depending from base 71 are formed having aligned holes 88. The tip of the lifting arm 76 is formed having a hole 89 therethrough aligned with bracket holes 88 when the lifting arm is pivoted up against the base 71. A pin (not shown) may then be inserted through holes 88 and 89 to retain the lifting arm 76 in retracted position when the vehicle attached jack is not in use.

Air is introduced through a fitting 90 communicating with the interior of the hose 42 to inflate the hose and forcibly lower the lifting arm 76, raising the vehicle wheels off the ground. The source of air under pressure supplied through hose 91 may be a compressor driven off the internal combustion engine of the vehicle. Alternatively, one of the cylinders of the internal combustion engine may be tapped to supply pressurized gases during either the compression stroke or the power stroke of the piston operating therein. It is also envisioned that a separate aerosol can could be used to inflat the hose 42 and actuate the jack.

As seen in jack embodiment of FIGURES 8 through 11, the hose 42 is embodied in a small, portable jack, generally indicated at 100. Jack 100 includes a base 102, a top 104, and an intermediate rectangular frame member 106. Along two sides of the jack 100, a pair of links 110 are pivotally connected at their corresponding one ends to the base 102 as indicated at 111. The other ends of links 110 are pivotally connected to similar links 112 as indicated at 113; the other ends thereof being pivotally connected to the intermediate frame member 106 as indicated at 114. In corresponding fashion the intermediate frame member 106 is interconnected to the top 104 by pivotally interconnected links 120 and 122. As a consequence, the intermediate frame member 106 and the top 104 are movable vertically relative to the base 102.

One end of the firehose 42 is pinched off between a clamping bar and the base 102 as indicated at 130. The hose 42 is folded several times on itself and extending through the open interior of the intermediate frame member 106 is pinched off at its other end between a clamping bar and the top 104 as indicated at 124. A fitting 126 mounted on the top 104 communicates with the interior of the hose 42. The fitting 126 is connected through a hose 128 to a source of pressurized air such as a compressed air bottle 132, seen in FIGURE 9.

As seen in FIGURE 10, upon inflation of the hose 42, the resulting expansion forces the top 104 upwardly relative to the base 102 of the jack. As inflation of the hose 42 increases, the top 104 engages the vehicle frame, indicated at 140 in FIGURE 10, to lift the vehicle.

*Summary*

It is seen that I have provided a novel and useful jack of simplified design and extremely low cost. The hose 42, as the jack pneumatic element, is an inexpensive and readily replaceable element of my invention. It will be appreciated that various modifications in the disclosed jack embodiments may be made without departing from my invention. For example, the ratchet and pawl mechanism shown in FIGURES 1 through 5 could be reversed with the ratchet teeth carried by the base 22 and the pawls 52 pivoted to the lifting arm 30. Moreover, this safety feature could also be incorporated in the other disclosed embodiments of my invention. Similarly, the separators 64 of FIGURES 1 through 5 may also be employed to advantage in the embodiment of FIGURES 6 and 7 and the embodiment of FIGURES 8 through 11. The rope 42a is preferably incorporated in all of my jack embodiments.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention which, as a matter of language, might be said to fall therebetween.

Having described my invention, what I claim as new and desire to secure by Letters Patent is:

1. A pneumatic jack comprising, in combination:
   (A) a base;
   (B) a lifting member mechanically connected to said base for movement relative thereto;
   (C) an elongated, flexible, tubular pneumatic element folded at least once on itself along the length of and disposed substantially between said base and said lifting member,
      (1) the ends of said pneumatic element being closed off so as to provide a fluid-tight chamber; and
   (D) an external connection communicating with the interior of said pneumatic element for conveying fluid under pressure into said chamber to expand said pneumatic element and forcibly move said lifting member in a direction away from said base.

2. The jack defined in claim 1 wherein said pneumatic element is in the form of an open ended length of hose, one open end of said hose being pinched off between a clamping bar and said base, and the other open end of said hose being similarly pinched off between a clamping bar and said lifting member.

3. The jack defined in claim 1 wherein said lifting member is in the form of an arm pivotally connected at one end to said base, the overlying folded sections of said pneumatic element extending from adjacent the pivotal connection of said base and lifting member along a substantial portion of the length of said lifting member.

4. The jack defined in claim 3 which further includes
   (E) a plate-like member pivotally connected to the other end of said lifting member.

5. The jack defined in claim 4 which further includes
   (F) at least one stabilizing bar pivotally connected at one end to said base and pivotally connected at its other end to said plate-like member so as to maintain said plate-like member oriented substantially parallel to said base during movement of said lifting member.

6. The jack defined in claim 1 which further includes
   (E) a series of ratchet teeth carried by either one of said lifting member and base;
   (F) a pawl pivotally connected at its end to the other one of said base and lifting member
      (1) the tip of said pawl adapted to engage said ratchet teeth to maintain said lifting member in any desired position relative to said base.

7. The jack defined in claim 6 which further includes
   (G) a guide plate mounted for movement relative to said ratchet teeth, said guide plate including
      (1) an elongated slot extending substantially parallel to said ratchet teeth and
      (2) receiving a pin affixed to said pawl,
      (3) whereby said pawl tip is carried along in engageable relationship to said ratchet teeth during movement of said lifting member.

8. The jack defined in claim 7 which further includes
   (H) an actuator interconnected with said guide plate to effect movement thereof relative to said ratchet teeth and thereby selectively engage and disengage said pawl tip with said ratchet teeth.

9. The jack defined in claim 1 which further includes
   (E) individual separators interposed between overlying folded sections of said pneumatic element to provide flat backing surfaces against which said folded sections may expand.

10. The jack defined in claim 1 wherein said base is fixedly attached to the frame of a vehicle.

11. The jack defined in claim 1 wherein said lifting member is in the form of a generally flat plate interconnected to said base by an array of pivoted linkage members, whereby said lifting member is maintained in substantial parallel orientation to said base during movement relative thereto.

12. The jack defined in claim 11 which further includes
   (E) a frame interposed between said lifting member and said base in substantially parallel relationship thereto,
      (1) said frame having a central opening accommodating said pneumatic element, and
      (2) said linkage members interconnecting said lifting member to said frame, and said frame, in turn, to said base.

13. The jack defined in claim 5 which further includes
   (G) an attachment adapting said jack as a bumper jack for vehicles, said attachment including
      (1) an elongated beam,
      (2) a trough-shaped member adjacent each end of said beam for engaging at spaced locations the lower edge of a vehicle bumper, and (3) a bracket affixed to the mid-portion of said beam for detachably horizontally mounting said beam to said top plate.

14. The jack defined in claim 1 which further includes
(E) a strand-like member disposed within said pneumatic element and running substantially the length thereof,
   (1) said member operating to prevent the walls of said pneumatic element from pinching completely together,
   (2) thereby insuring distribution of said fluid throughout the length of said pneumatic element.

References Cited

UNITED STATES PATENTS

| | | | |
|---|---|---|---|
| 1,492,158 | 4/1924 | Caretta | 92—92 |
| 2,001,744 | 5/1935 | Patterson. | |
| 2,070,960 | 2/1937 | Phillips | 254—93 |
| 3,047,257 | 7/1962 | Chester | 254—93 |

FOREIGN PATENTS 807,389  10/1936  France.

OTHELL M. SIMPSON, *Primary Examiner.*